United States Patent
Proust et al.

(10) Patent No.: US 9,946,888 B2
(45) Date of Patent: Apr. 17, 2018

(54) SYSTEM FOR MANAGING MULTIPLE SUBSCRIPTIONS IN A UICC

(75) Inventors: Philippe Proust, Marseilles (FR); Pierre Girard, La Destrousse (FR)

(73) Assignee: GEMALTO SA, Meudon (FR)

( * ) Notice: Subject to any disclaimer, the term of this patent is extended or adjusted under 35 U.S.C. 154(b) by 27 days.

(21) Appl. No.: 13/992,039

(22) PCT Filed: Dec. 5, 2011

(86) PCT No.: PCT/EP2011/071785
§ 371 (c)(1),
(2), (4) Date: Oct. 25, 2013

(87) PCT Pub. No.: WO2012/076485
PCT Pub. Date: Jun. 14, 2012

(65) Prior Publication Data
US 2014/0057680 A1    Feb. 27, 2014

Related U.S. Application Data

(63) Continuation of application No. 13/312,309, filed on Dec. 6, 2011, now Pat. No. 9,301,145.

(30) Foreign Application Priority Data

Dec. 6, 2010  (EP) .................................... 10306359

(51) Int. Cl.
*G06F 21/62*    (2013.01)
*H04W 8/24*    (2009.01)
(Continued)

(52) U.S. Cl.
CPC ............ *G06F 21/6218* (2013.01); *G06F 8/61* (2013.01); *H04B 1/3816* (2013.01);
(Continued)

(58) Field of Classification Search
CPC .. H04B 1/38; H04L 29/06; H04K 1/00; G06F 21/6218
See application file for complete search history.

(56) References Cited

U.S. PATENT DOCUMENTS 6,978,152 B1    12/2005   Yamaashi et al.
7,024,390 B1    4/2006    Mori et al.
(Continued)

FOREIGN PATENT DOCUMENTS

CN    101080051 A    11/2007
CN    101179401 A    5/2008
(Continued)

OTHER PUBLICATIONS

Office Action (Notice of Reasons for Rejection) dated Aug. 19, 2014, by the Japan Patent Office in Japanese Patent Application No. 2013-542497, and an English Translation of the Office Action. (9 pages).

(Continued)

*Primary Examiner* — Myron K Wyche
(74) *Attorney, Agent, or Firm* — Buchanan Ingersoll & Rooney PC

(57) ABSTRACT

The invention relates to a system for managing multiple subscriptions in a UICC, this system comprising a central server able to manage subscriptions stored on a UICC comprised in a mobile terminal in the field, at the request of a subscriber of one of these subscriptions.

7 Claims, 2 Drawing Sheets

(51) Int. Cl.

| | | |
|---|---|---|
| *H04W 12/10* | (2009.01) | |
| *G06F 9/445* | (2018.01) | |
| *H04W 4/00* | (2018.01) | |
| *H04W 8/20* | (2009.01) | |
| *H04W 12/04* | (2009.01) | |
| *H04L 29/06* | (2006.01) | |
| *H04W 12/06* | (2009.01) | |
| *H04L 29/08* | (2006.01) | |
| *H04L 9/08* | (2006.01) | |
| *H04W 8/22* | (2009.01) | |
| *H04B 1/3816* | (2015.01) | |
| *H04W 12/08* | (2009.01) | |
| *H04W 8/18* | (2009.01) | |
| *H04W 84/04* | (2009.01) | |

(52) U.S. Cl.
CPC ........ *H04L 9/0825* (2013.01); *H04L 63/0428* (2013.01); *H04L 63/08* (2013.01); *H04L 63/083* (2013.01); *H04L 63/123* (2013.01); *H04L 67/34* (2013.01); *H04W 4/001* (2013.01); *H04W 4/003* (2013.01); *H04W 4/005* (2013.01); *H04W 8/183* (2013.01); *H04W 8/205* (2013.01); *H04W 8/22* (2013.01); *H04W 8/245* (2013.01); *H04W 12/04* (2013.01); *H04W 12/06* (2013.01); *H04W 12/08* (2013.01); *H04W 12/10* (2013.01); *H04W 8/18* (2013.01); *H04W 84/04* (2013.01)

(56) References Cited

U.S. PATENT DOCUMENTS

| | | |
|---|---|---|
| 7,146,161 B2 | 12/2006 | Chou |
| 7,349,719 B2 | 3/2008 | Buniatyan |
| 7,363,056 B2 | 4/2008 | Faisy |
| 9,092,775 B2 | 7/2015 | Bernard et al. |
| 2002/0186845 A1* | 12/2002 | Dutta ............... G06Q 20/32 380/247 |
| 2004/0131186 A1 | 7/2004 | Kasuya et al. |
| 2004/0235523 A1 | 11/2004 | Schrire et al. |
| 2005/0021875 A1 | 1/2005 | Bouthemy et al. |
| 2005/0164737 A1 | 7/2005 | Brown |
| 2005/0186954 A1 | 8/2005 | Kenney |
| 2005/0239504 A1 | 10/2005 | Ishii et al. |
| 2005/0266883 A1 | 12/2005 | Chatrath |
| 2005/0279826 A1 | 12/2005 | Merrien |
| 2006/0049243 A1 | 3/2006 | Sakamura et al. |
| 2006/0079284 A1 | 4/2006 | Lu et al. |
| 2006/0086785 A1 | 4/2006 | Sakata |
| 2006/0196931 A1 | 9/2006 | Holtmanns et al. |
| 2006/0199614 A1 | 9/2006 | Hyacinthe |
| 2007/0105532 A1 | 5/2007 | Martin et al. |
| 2007/0239857 A1 | 10/2007 | Mahalal et al. |
| 2008/0090614 A1 | 4/2008 | Sicher et al. |
| 2008/0130879 A1 | 6/2008 | Heinonen et al. |
| 2008/0261561 A1 | 10/2008 | Gehrmann |
| 2008/0292074 A1 | 11/2008 | Boni et al. |
| 2008/0319823 A1 | 12/2008 | Ahn et al. |
| 2009/0159692 A1 | 6/2009 | Chew et al. |
| 2009/0163175 A1 | 6/2009 | Shi et al. |
| 2009/0191857 A1 | 7/2009 | Horn et al. |
| 2009/0191917 A1 | 7/2009 | Zappulla et al. |
| 2009/0191918 A1 | 7/2009 | Mardiks |
| 2009/0215431 A1 | 8/2009 | Koraichi |
| 2009/0217348 A1 | 8/2009 | Salmela et al. |
| 2009/0307142 A1 | 12/2009 | Mardikar |
| 2010/0179907 A1 | 7/2010 | Atkinson |
| 2010/0291904 A1* | 11/2010 | Musfeldt ........... G06F 21/604 455/414.1 |
| 2010/0293613 A1* | 11/2010 | Hum ............... G06Q 20/32 726/20 |
| 2011/0028126 A1 | 2/2011 | Lim et al. |
| 2011/0028135 A1* | 2/2011 | Srinivasan ........ H04M 3/42382 455/415 |
| 2011/0035584 A1 | 2/2011 | Meyerstein et al. |
| 2011/0059773 A1 | 3/2011 | Neumann et al. |
| 2011/0081950 A1 | 4/2011 | Guven |
| 2011/0126183 A1 | 5/2011 | Bernard et al. |
| 2011/0136482 A1 | 6/2011 | Kaliner |
| 2011/0237190 A1 | 9/2011 | Jolivet |
| 2011/0302641 A1 | 12/2011 | Hald et al. |
| 2011/0320600 A1 | 12/2011 | Froeding et al. |
| 2012/0028609 A1 | 2/2012 | Hruska |
| 2012/0042396 A1* | 2/2012 | Guerra .................... G06F 21/88 726/30 |
| 2012/0108295 A1 | 5/2012 | Schell et al. |
| 2012/0113865 A1* | 5/2012 | Zhao .................... H04W 48/20 370/254 |
| 2012/0190354 A1 | 7/2012 | Merrien et al. |
| 2012/0297473 A1 | 11/2012 | Case et al. |
| 2013/0318355 A1 | 11/2013 | Girard et al. |
| 2013/0324091 A1 | 12/2013 | Girard et al. |
| 2013/0329683 A1 | 12/2013 | Berard et al. |
| 2014/0019760 A1 | 1/2014 | Vergnes et al. |
| 2014/0024343 A1 | 1/2014 | Bradley |
| 2014/0031083 A1 | 1/2014 | Vergnes et al. |
| 2014/0066011 A1 | 3/2014 | Bradley |
| 2014/0122872 A1 | 5/2014 | Merrien et al. |
| 2014/0141747 A1 | 5/2014 | Merrien et al. |

FOREIGN PATENT DOCUMENTS

| | | | |
|---|---|---|---|
| CN | 101309518 A | 11/2008 | |
| DE | 10 2008 033 976 A1 | 1/2010 | |
| EP | 1 650 717 A1 | 4/2006 | |
| EP | 1 965 596 A1 | 9/2008 | |
| EP | 2 056 523 A1 | 5/2009 | |
| EP | 2 076 071 A1 | 7/2009 | |
| FR | 2 871 020 A1 | 12/2005 | |
| GB | 2 457 221 | 8/2009 | |
| JP | 2002-236572 A | 8/2002 | |
| JP | 2005-323128 A | 11/2005 | |
| JP | 2006-050554 A | 2/2006 | |
| JP | 2006-107316 A | 4/2006 | |
| JP | 2007-019897 A | 1/2007 | |
| JP | 2007-513534 A | 5/2007 | |
| JP | 2007-201883 A | 8/2007 | |
| JP | 2007-235492 A | 9/2007 | |
| JP | 2008-131469 A | 6/2008 | |
| JP | 2008-519343 A | 6/2008 | |
| JP | 2009-037602 A | 2/2009 | |
| JP | 2009-038598 A | 2/2009 | |
| JP | 2010-501092 A | 1/2010 | |
| JP | 2010-532107 A | 9/2010 | |
| JP | 2011-525311 A | 9/2011 | |
| JP | 2012-528534 A | 11/2012 | |
| KR | 2002-0066032 A | 8/2002 | |
| KR | 2003-0044260 A | 6/2003 | |
| KR | 10-0489783 B1 | 5/2005 | |
| KR | 10-2005-0095424 A | 9/2005 | |
| KR | 2007-0095048 A | 9/2007 | |
| KR | 10-2008-0014285 A | 2/2008 | |
| KR | 10-2008-0015870 A | 2/2008 | |
| KR | 10-2009-0056019 A | 6/2009 | |
| KR | 10-2010-0095648 A | 8/2010 | |
| KR | 10-2010-011642 A | 10/2010 | |
| WO | 02/082715 A1 | 10/2002 | |
| WO | 03/104997 A1 | 12/2003 | |
| WO | 20041021296 A1 | 3/2004 | |
| WO | 2004/105421 A2 | 12/2004 | |
| WO | 2007/058241 A1 | 5/2007 | |
| WO | 20081123827 A1 | 10/2008 | |
| WO | 20081128874 A1 | 10/2008 | |
| WO | WO/2009/103623 | * 2/2009 | ........... H04W 12/06 |
| WO | 2009/055910 A1 | 5/2009 | |
| WO | 2009/092115 A2 | 7/2009 | |
| WO | 2009091837 A1 | 7/2009 | |
| WO | 2009/095295 A1 | 8/2009 | |
| WO | WO/2009/103623 | * 8/2009 | ........... H04W 12/06 |
| WO | WO 2009/103623 A2 | 8/2009 | |

(56) References Cited

FOREIGN PATENT DOCUMENTS

| | | |
|---|---|---|
| WO | 2009/141024 A1 | 11/2009 |
| WO | 20091141035 A1 | 11/2009 |
| WO | 2009/149788 A2 | 12/2009 |
| WO | 2010/052332 A1 | 5/2010 |
| WO | 2010068016 A3 | 6/2010 |
| WO | 20101138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

Office Action (Notice of Preliminary Rejection) dated Jun. 27, 2014, by the Korean Intellectual Property Office, in Korean Patent Application No. 10-2013-7017637, and an English Translation of the Office Action. (7pages).
Office Action (Notice of Preliminary Rejection) dated Aug. 19, 2014, by the Korean Intellectual Property Office in Korean Patent Application No. 10-2013-7016486, and an English Translation of the Office Action. (6 pages).
Office Action (Notice of Reasons for Rejection) dated Aug. 5, 2014, by the Japan Patent Office in Japanese Patent Application No. 2013-542474, and an English Translation of the Office Action. (4 pages).
International Search Report (PCT/ISA/210) dated Apr. 5, 2012, by the European Patent Office as the International Searching Authority for International Application No. PCT/EP2011/071785.
Written Opinion (PCT/ISA/237) dated Apr. 5, 2012, by the European Patent Office as the International Searching Authority for International Application No. PCT/EP2011/071785.
"3rd Generation Partnership Project; Technical Specification Group Services and System Aspects; Service aspects; Service principles (Release 11)", 3GPP TS 22.101 V11.0.0 (Sep. 2010), pp. 1-60.
An English Translation of the Office Action (Notice of Reasons for Rejection) dated Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the MILENAGE Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
International Search Report (Form PCT/ISA/210) and the Written Opinion of the International Searching Authority (Form PCT/ISA/237) dated Feb. 22, 2012, by the European Patent Office in the International Application No. PCT/EP2011/071674. (8 pages).
Vergnes et al., U.S. Appl. No. 13/992,103, entitle "Method for Exporting Data of a Javacard Application Stored in a UICC to a Host" filed Jun. 6, 2013.
International Search Report (Form PCT/ISA/210) and the Written Opinion of the International Searching Authority (Form PCT/ISA/237) dated Feb. 27, 2012, by the European Patent Office in the International Application No. PCT/EP2011/071660. (6 pages).
An English Translation of the Office Action (Notice of Reasons for Rejection) dated Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) dated Apr. 16, 2012, by the European Patent Office in the International Application No. PCT/EP2011/071919. (7 pages).

An English Translation of the Office Action (Notice of Reasons for Rejection) dated Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) dated Feb. 15, 2012, by the European Patent Office in the International Application No. PCT/EP2011/071778. (9 pages).
International Search Report (Form PCT/ISA/210) and the Written Opinion of the International Searching Authority (Form PCT/ISA/237) dated Feb. 27, 2012, by the European Patent Office in the International Application No. PCT/EP2011/071781. (11 pages).
International Search Report (Form PCT/ISA/210) and the Written Opinion of the International Searching Authority (Form PCT/ISA/237) dated Mar. 28, 2012, by the European Patent Office in the International Application No. PCT/EP2011/071737. (6 pages).
International Search Report (Form PCT/ISA/210) and the Written Opinion of the International Searching Authority (Form PCT/ISA/237) dated Apr. 4, 2012, by the European Patent Office in the International Application No. PCT/EP2011/071731. (12 pages).
Partial European Search Report dated Jul. 22, 2011, by the European Patent Office in the European Application No. 10 30 6359. (7 pages).
International Search Report (Form PCT/ISA/210) and the Written Opinion of the International Searching Authority (Form PCT/ISA/237) dated Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) dated Feb. 27, 2012, by the European Patent Office in the International Application No. PCT/EP2011/071664. (8 pages).
Written Opinion of the International Preliminary Examining Authority (Form PCT/IPEA/408) dated Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) dated Mar. 8, 2013, by the European Patent Office in the International Application No. PCT/EP2011/071664. (14 pages).
Office Action issued by the U.S. Patent and Trademark Office in the U.S. Appl. No. 13/312,309, dated Sep. 25, 2013, U.S. Patent and Trademark Office, Alexandria, VA. (13 pages).
Office Action issued by the U.S. Patent and Trademark Office in the U.S. Appl. No. 13/312,309, dated Apr. 24, 2014, U.S. Patent and Trademark Office, Alexandria, VA. (13 pages).
"IP Based Over-the Air Handset Configuration Management (IOTA-HCM), 3rd Generation Partnership Project 2 3GPP2", 3GPP2 C.S0040, Version 1.0, Jul. 18, 2003, pp. 1-68.
"Smart Cards; Card Application Toolkit (CAT) (Release 9)", ETSI TS 102 223, vol. SCP TEC, No. V9.2.0, (Oct. 1, 2010), pp. 1-209.
International Search Report (Form PCT/ISA/210) and the Written Opinion of the International Searching Authority (Form PCT/ISA/237) dated Feb. 22, 2012, by the European Patent Office in the International Application No. PCT/EP2011/071675. (12 pages).
Madlmayr et al., "The Benefit of using SIM Application Toolkit in the Context of Near Field Communication Applications" International Conference on the Management of Mobile Business, (Jul. 2007), (8 pages).
"3rd Generation Partnership Project; Technical Specification Group Services and System Aspects; Feasibility Study on Remote Management of USIM Application on M2M Equipment (Release 8)", Global System for Mobile Communications, 3GPP TR 33.812, V1.0.0, Sep. 2008, pp. 1-80.
Office Action issued by the U.S. Patent and Trademark Office in the U.S. Appl. No. 13/991,766, dated Mar. 17, 2015, U.S. Patent and Trademark Office, Alexandria, VA. (33 pages).
English translation of Office Action issued by the Korean Patent Office dated Aug. 28, 2014 in corresponding Korean Application No. 10-2013-7016004. (3 pages).
English translation of Office Action issued by the Korean Patent Office dated Apr. 16, 2015 in corresponding Korean Application No. 10-2013-7016004. (2 pages).

(56) References Cited

OTHER PUBLICATIONS

Office Action issued by the Russian Patent Office dated Dec. 29, 2014 in corresponding Russian Application No. 2013131034, and English translation of Office Action. (6 pages).
Office Action issued by the U.S. Patent and Trademark Office in the U.S. Appl. No. 13/991,744, dated Jun. 2, 2015, U.S. Patent and Trademark Office, Alexandria, VA. (35 pages).
Office Action issued by the U.S. Patent and Trademark Office in the U.S. Appl. No. 13/991,689, dated Jun. 18, 2015, U.S. Patent and Trademark Office, Alexandria, VA. (46 pages).
Office Action issued by the U.S. Patent and Trademark Office in the U.S. Appl. No. 13/991,823, dated Jul. 13, 2015, U.S. Patent and Trademark Office, Alexandria, VA. (21 pages).
Office Action issued by the U.S. Patent and Trademark Office in the U.S. Appl. No. 13/991,912, dated Jul. 23, 2015, U.S. Patent and Trademark Office, Alexandria, VA. (45 pages).
Office Action issued by the U.S. Patent and Trademark Office in the U.S. Appl. No. 13/992,103, dated Jul. 13, 2015, U.S. Patent and Trademark Office, Alexandria, VA. (42 pages).
Office Action issued by the U.S. Patent and Trademark Office in the U.S. Appl. No. 13/992,065, dated Jul. 30, 2015, U.S. Patent and Trademark Office, Alexandria, VA. (32 pages).
Office Action (Notice of Preliminary Rejection) dated Feb. 25, 2015, by the Korean Patent Office in Korean Patent Application No. 10-2013-0717638, and an English Translation of the Office Action. (7 pages).
Office Action issued by the U.S. Patent and Trademark Office in the U.S. Appl. No. 13/991,823, dated Jan. 5, 2015, U.S. Patent and Trademark Office, Alexandria, VA. (25 pages).
Office Action issued by the U.S. Patent and Trademark Office in the U.S. Patent Application No. 13/991,846, dated Feb. 10, 2015, U.S. Patent and Trademark Office, Alexandria, VA. (26 pages).
Office Action issued by the U.S. Patent and Trademark Office in the U.S. Appl. No. 13/992,065, dated Dec. 18, 2014, U.S. Patent and Trademark Office, Alexandria, VA. (26 pages).
Office Action issued by the U.S. Patent and Trademark Office in the U.S. Appl. No. 13/991,744, dated Dec. 12, 2014, U.S. Patent and Trademark Office, Alexandria, VA. (33 pages).
Notice of Allowance issued by the U.S. Patent and Trademark Office in the U.S. Appl. No. 13/991,752, dated Jan. 21, 2015, U.S. Patent and Trademark Office, Alexandria, VA. (30 pages).
Office Action dated Nov. 17, 2015 by the Chinese Patent Office in corresponding Chinese Patent Application No. 201180058925.6 (10 pages).
Office Action issued by the U.S. Patent and Trademark Office in the U.S. Appl. No. 13/991,766, dated Oct. 1, 2015, U.S. Patent and Trademark Office, Alexandria, VA. (27 pages).
Office Action issued by the U.S. Patent and Trademark Office in the U.S. Appl. No. 13/991,846, dated Oct. 15, 2015, U.S. Patent and Trademark Office, Alexandria, VA. (23 pages).
Office Action issued by the U.S. Patent and Trademark Office in the U.S. Appl. No. 14/603,889, dated Oct. 23, 2015, U.S. Patent and Trademark Office, Alexandria, VA. (36 pages).
Office Action issued by the Chinese Patent Office dated Aug. 27, 2015 in corresponding Chinese Application No. 201180058683.0, and English language translation of Office Action. (17 pages).
Office Action issued by the U.S. Patent and Trademark Office in U.S. Appl. No. 13/992,103, dated Nov. 25, 2015, U.S. Patent and Trademark Office, Alexandria, VA (22 pages).
Office Action issued by the Chinese Patent Office dated Aug. 19, 2015 in corresponding Chinese Application No. 201180058922.2, and English language translation of Office Action (16 pages).
Office Action issued by the Chinese Patent Office dated Nov. 4, 2015 in corresponding Chinese Application No. 201180058688.3 (5 pages).
Office Action (Notice of Reasons for Rejection) dated Feb. 2, 2016, by the Japanese Patent Office in Japanese Patent Application No. 2015-018547, and an English Translation of the Office Action. (5 pages).
Office Action dated Jan. 19, 2016, by the European Patent Office in European Patent Application No. 11 811 335.6 (4 pages).
3rd Generation Partnership Project; Technical Specification Group Services and System Aspects; Feasibility study on the security aspects of remote provisioning and change of subscription for Machine to Machine (M2M) equipment (Release 9); 3GPP Draft; 33812-920, published by the 3rd Generation Partnership Project (3GPP) in Sophia-Antipolis Cedex, France on Jun. 22, 2010 (87 pages).
Office Action issued by the U.S. Patent and Trademark Office in the U.S. Appl. No. 13/992,103, dated Mar. 30, 2016, U.S. Patent and Trademark Office, Alexandria, VA. (15 pages).
Office Action issued by the U.S. Patent and Trademark Office in the U.S. Appl. No. 13/991,846, dated Apr. 5, 2016, U.S. Patent and Trademark Office, Alexandria, VA. (24 pages).
3GPP TS 22.101 V11.0.0 (Sep. 2010), Sep. 2010.
European Office Action dated Dec. 23, 2015 issued in corresponding European Patent Appln. No. 11 810 809.1 (5 pages).
European Office Action dated Jan. 19, 2016 issued in corresponding European Patent Appln. No. 11 811 335.6 (6 pages).
Japanese Office Action dated Jan. 5, 2016 issued in corresponding Japanese Patent Appln. No. 2015-082449, with English translation (5 pages).
Japanese Office Action dated Jan. 19, 2016 issued in corresponding Japanese Patent Appln. No. 2013-054275 with English translation (14 pages).
U.S. Office Action dated Feb. 1, 2016 issued in corresponding U.S. Appl. No. 13/991,823 (15 pages).
U.S. Office Action dated Feb. 2, 2016 issued in corresponding U.S. Appl. No. 13/991,912 (30 pages).
U.S. Office Action dated Feb. 10, 2016 issued in corresponding U.S. Appl. No. 13/992,065 (23 pages).

* cited by examiner

SYSTEM FOR MANAGING MULTIPLE SUBSCRIPTIONS IN A UICC

This disclosure is a national phase of PCT/EP2011/071785, filed Dec. 5, 2011, a continuation of U.S. application Ser. No. 13/312,309, filed Dec. 6, 2011, and claims priority to European Application No. 10306359.0, filed Dec. 6, 2010, the disclosures of which are hereby incorporated by reference.

The present invention concerns a system for managing multiple subscriptions in a UICC (Universal Integrated Circuit Card).

A UICC is a secure element that typically embeds Sim applications. It is installed, fixedly or not, in terminals, like for example mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the motherboard of the terminal or machine and constitutes an e-UICC.

A parallel can be done between an e-UICC and UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

DETAILED DESCRIPTION

The present invention concerns a centralized service that can notably be used for lost or stolen mobile devices.

This invention aims to simplify procedures for a user that has lost his mobile phone and who has multiple subscriptions on the UICC it contains. The UICC can be removable or not.

Today it is more and more common for a user to have multiple telecommunications subscriptions available on his mobile. Several examples can be mentioned:

Mobile phones featuring multiple UICC slots;

The dual IMSI cards that allow two different subscriptions (e.g.: one personal and one professional subscription or two (or more) subscriptions from different countries for cross-border workers);

In Brazil, it is mandatory to have an emergency call on all new vehicles. They are equipped with so called white SIM pre-loaded with one subscription for each MNO of the country.

With several subscriptions in his UICC, it is a burden for the user to call all hotlines from different operators to block all his subscriptions, if his mobile device has been stolen or lost.

In addition, as in the Brazilian case, the user may not even know (or have forgotten) the activated subscriptions from all the pre-loaded subscriptions on his device.

Figure 1:
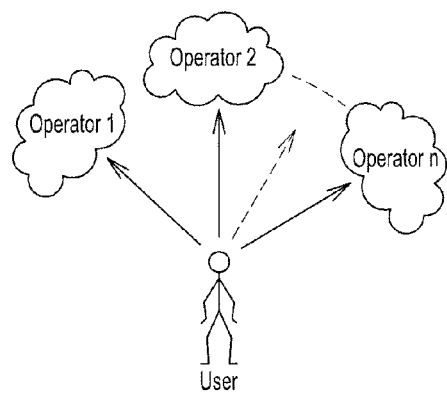
FIG. 1 is a schematic illustration of the relationship of a user to multiple network operator.

This situation can be described by FIG. 1 which is self-explanatory.

The invention proposes to provide a unique centralized service for lost and stolen mobile phones that will be able to perform an action on mobile device on the user's behalf.

The invention proposes a system for managing multiple subscriptions in a UICC, the system comprising a central server able to manage subscriptions stored on a UICC comprised in a mobile terminal in the field, at the request of a subscriber of one of these subscriptions.

Preferably, the central server is connected to a plurality of MNOs.

In another embodiment, the central server is connected to a unique MNO.

The management request is preferably made from the subscriber to the central server.

In another embodiment, the management request is made from the subscriber to one of the MNOs.

Preferably, the management of subscriptions consists in at least one of the following tasks:

Temporarily or definitively block one or several subscriptions;
Temporarily or definitively block one or several services from one or several subscriptions;
Send short message to try to warn with the person handling the terminal;
Geo-localize the terminal;
Recovery of the data on the terminal and the UICC;
Deletion or encryption of the data on the terminal;
Selection of a specific application that will allow to re-activate one of several subscriptions if the terminal is rediscovered.

The invention proposes a system for managing multiple subscriptions in a UICC, the system comprising a central server able to manage subscriptions stored on a UICC comprised in a mobile terminal in the field.

Figure 3:
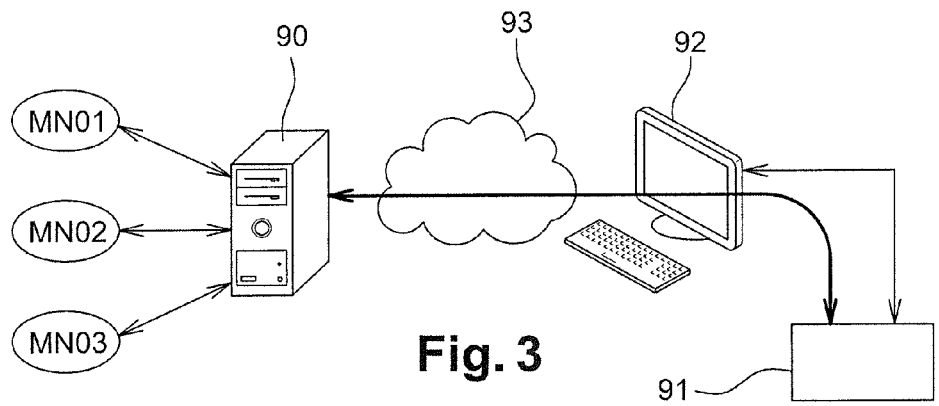

FIG. 3 represents such a system.

In FIG. 3, a central server 90 manages subscriptions stored in a UICC 91 comprised in a terminal 92. The central server 90 manages these subscriptions through a network 93, for example Internet. Central server 90 is connected to different telecommunication networks of operators MNO1 to MNO3.

Figure 4:
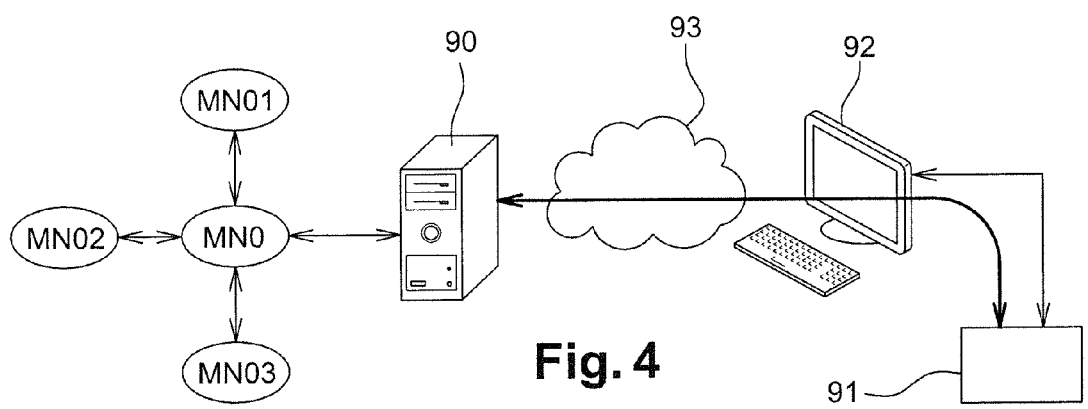
FIG. 4 illustrates an embodiment in which a user is associated with a single network operator.

In another configuration of the system represented in FIG. 4, the central server is connected to a single operator's network (MNO) and communicates with the other networks MNO1 to MNO3 through this network MNO.

Central server 90 can act as a manager of the subscriptions present on UICC 91. He can for example install a new subscription on the UICC, at the request of the user of terminal 92.

The system according to this invention allows a user that has lost his terminal to contact a single entity, the central server 90, in order to ask to this entity to manage its subscriptions. Such a management of subscriptions can for example consist in:

Temporarily or definitively block one or several subscriptions;
Temporarily or definitively block one or several services from one or several subscriptions;
Send short messages to try to warn the person handling the terminal;
Geo-localize the terminal;
Recovery of the data on the terminal and the UICC;
Deleting or encrypting the data present on the terminal;
Selecting a specific application that will allow to re-activate one of several subscriptions if the terminal is rediscovered.

This management also applies in case of a stolen terminal.

Figure 2:
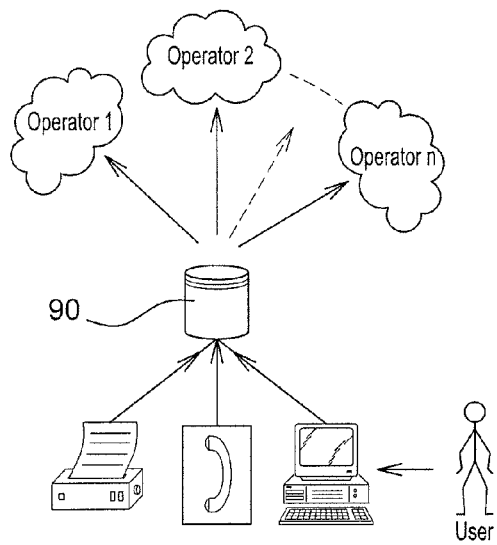
FIGS. 2 and 3 illustrate embodiments of a system in which a user is associated with a plurality of network operators.

In order to contact the central server 90, the user can contact directly the central server 90, as shown in FIG. 2. He can contact the server 90 by fax, phone or over the Internet. Since the server 90 knows which subscriptions have been installed on the lost/stolen UICC, it will be able to take the appropriate actions, at the request of the user.

An alternative for the user is to contact one of his MNOs who will warn the central server 90. The latter will take the appropriate actions.

Figure 5:
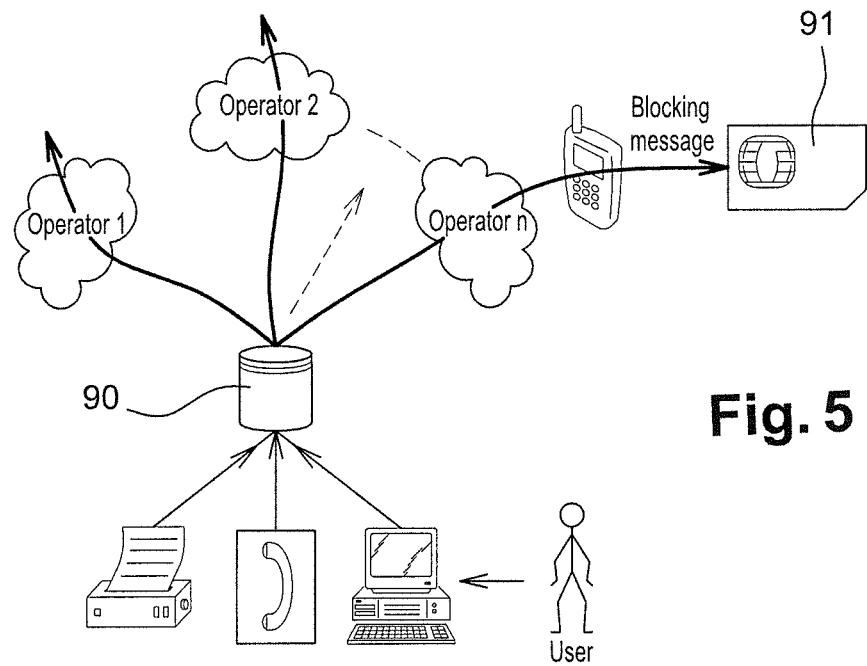
FIGS. 5 and 6 illustrate embodiments in which a central server sends a message to a UICC.
Figure 6:
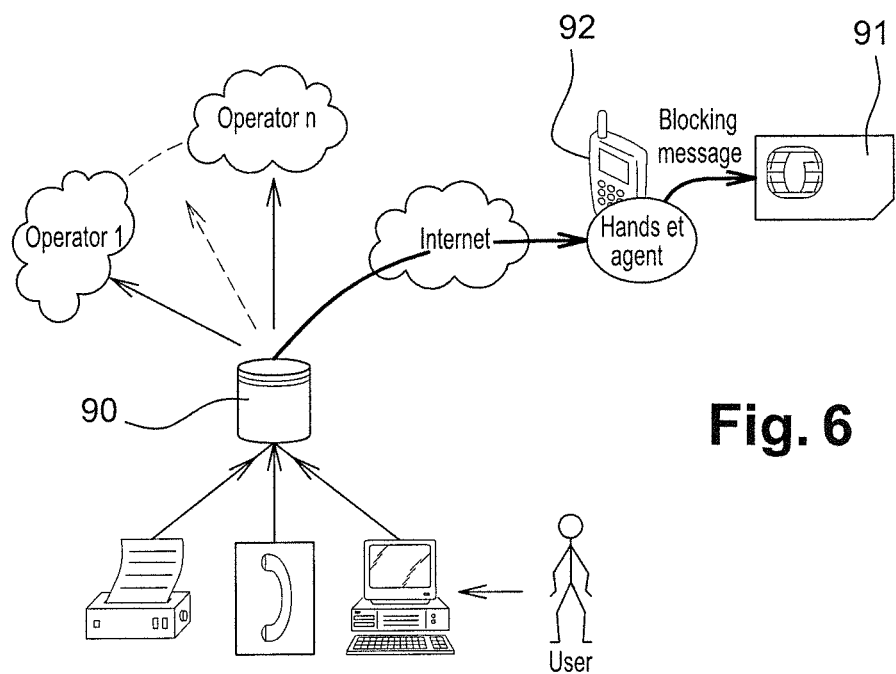

Alternatively, as shown in FIG. 5, the central server 90 may try to send a short message to a specific application located in the UICC 91 that will directly perform the action on the UICC 91 instead of performing it in all the networks. As the central server 90 may not be aware of the currently active subscription (and the associated MSISDN), it will try to reach the UICC with all the potential MSISDN A third alternative depicted in FIG. 6 would be to reach the UICC 91 via another network than a 2G/3G one like Wi-Fi or even a wired network. In this case, the central server 90 will try to reach an agent on the terminal 92 that will forward the messages to the UICC 91 and perform actions.

The main advantage of the invention is that it provides a convenient and fast way to block all subscriptions related to lost or stolen mobile terminals.

The invention claimed is:

1. System for managing multiple subscriptions in a UICC, said system comprising a central server able to manage a plurality of subscriptions stored on a UICC comprised in a mobile terminal in the field in a manner to block all subscriptions stored on said UICC, at the request of a subscriber of one of the plurality of subscriptions, wherein
said central server is connected to a plurality of mobile network operators (MNOs).

2. System according to claim 1, wherein said request is made from said subscriber to said central server.

3. System according to claim 1, wherein said request is made from said subscriber to one of said MNOs.

4. System according to claim 1, wherein said management of subscriptions comprises at least one of the following tasks:

Temporarily or definitively block one or several services from one or several subscriptions;
Send short message to try to warn a person handling said terminal;
Geo-localize said terminal;
Recovery of data on said terminal and said UICC;
Deletion or encryption of the data on said terminal;
Selection of a specific application that will enable one of several subscriptions to be re-activated if said terminal is rediscovered.

5. System according to claim 1, wherein said UICC is removable from said mobile terminal.

6. System according to claim 1, wherein said UICC is not removable from said mobile terminal.

7. A central server for managing multiple subscriptions in a UICC, said central server being configured to:
manage a plurality of subscriptions stored on a UICC comprised in a mobile terminal in the field; and
block all subscriptions stored on said UICC at the request of a subscriber of one of the plurality of subscriptions, wherein
said central server is connected to a plurality of mobile network operators (MNOs).

* * * * *